United States Patent
Ochs et al.

(10) Patent No.: US 10,156,462 B2
(45) Date of Patent: Dec. 18, 2018

(54) ERROR CORRECTION IN A VECTOR-BASED POSITION SENSING SYSTEM

(71) Applicant: GM GLOBAL TECHNOLOGY OPERATIONS LLC, Detroit, MI (US)

(72) Inventors: David S. Ochs, Troy, MI (US); Caleb W. Secrest, Shelby Township, MI (US); Yo Chan Son, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 95 days.

(21) Appl. No.: 15/344,743

(22) Filed: Nov. 7, 2016

(65) Prior Publication Data

US 2018/0128658 A1 May 10, 2018

(51) Int. Cl.
*G01D 18/00* (2006.01)
*G01D 5/16* (2006.01)
*G01D 5/20* (2006.01)
*G01D 5/244* (2006.01)

(52) U.S. Cl.
CPC ............. *G01D 18/002* (2013.01); *G01D 5/16* (2013.01); *G01D 5/208* (2013.01); *G01D 5/2448* (2013.01)

(58) Field of Classification Search
CPC .... G01D 18/002; G01D 5/16; G01D 5/24452; G01D 5/24476; G01D 5/2448; G01D 5/2449
USPC ....... 702/57, 73, 85, 94, 104, 106, 150, 151; 318/127, 128, 490, 560, 565, 652
See application file for complete search history.

(56) References Cited

U.S. PATENT DOCUMENTS

| | | | |
|---|---|---|---|
| 7,904,267 B2 | 3/2011 | Wells et al. | |
| 8,239,154 B2 | 8/2012 | Cheng | |
| 8,301,324 B2 | 10/2012 | Morris | |
| 2007/0205736 A1* | 9/2007 | Lindberg | G01D 5/24452 318/490 |
| 2009/0026994 A1* | 1/2009 | Namuduri | B62D 5/0484 318/565 |
| 2015/0207444 A1 | 7/2015 | Son et al. | |

FOREIGN PATENT DOCUMENTS

DE          10036090 A1     2/2002

* cited by examiner

*Primary Examiner* — John H Le
(74) *Attorney, Agent, or Firm* — Quinn IP Law

(57) ABSTRACT

A system includes a rotary device, a vector-based position sensor outputting raw sine and cosine signals indicative of an angular position of the rotary device, and a controller. The controller executes a method by receiving the raw sine and cosine signals from the sensor, generating corrected sine and cosine signals by applying an amplitude error input signal to a first integrator block using a first predetermined trigonometric relationship, and executing a control action for the rotary device via output signals using the corrected signals. The first predetermined trigonometric relationship is $S_C^2 - C_C^2$, with $S_C$ and $C_C$ being the respective corrected sine and cosine signals. The controller may use a second predetermined trigonometric relationship, $S_C \cdot C_C$, to apply an orthogonality error input signal to a second integrator block.

16 Claims, 3 Drawing Sheets

ERROR CORRECTION IN A VECTOR-BASED POSITION SENSING SYSTEM

INTRODUCTION

The present disclosure relates to the automatic correction of position signal errors in a system having a rotary device whose absolute angular position is determined using a vector-based position sensor or methodology. Rotary devices may be variously embodied as wheels, hubs, gear elements, or shafts. Knowledge of the angular position of the rotary device may be required, e.g., for accurate control and monitoring of the rotary device or of a system using the same. Encoders and resolvers are examples of vector-based position sensors that determine angular position using rotary transformer pairs. Other types of vector-based position sensors include magneto-resistive sensors and certain "sensor-less" technologies.

A vector-based position sensor outputs raw sine and cosine signals. Ideally, the sine and cosine signals are orthogonal with respect to each other and have the same amplitude. However, imperfections in sensing and signal transmission hardware may produce signal delay, noise, and other anomalies. As a result, the sine and cosine signals may not be exactly 90 degrees out of phase with respect to each other and/or may have different amplitudes. In turn, such orthogonality and/or amplitude errors may affect control of the rotary device, e.g., as current ripple and torque ripple when the rotary device is embodied as a rotor of an electric machine.

SUMMARY

A vector-based position sensing system and position error correction method for such a system are disclosed herein. The present approach is input signal-driven, i.e., the approach operates directly on measured raw sine and cosine signals as provided by a vector-based position sensor. More specifically, a controller in communication with the vector-based position sensor applies predetermined trigonometric relationships to generate error signals which in turn drive various integral control loops. The integral control loops correct the raw sine/cosine signals for amplitude and/or orthogonality errors in different embodiments. The corrected sine/cosine signals are thereafter used by the controller to execute a control action with respect to operation of the rotary device.

In a particular embodiment, the system includes a rotary device, a vector-based position sensor, and a controller. The position sensor is configured to output raw sine and cosine signals indicative of an angular position of the rotary device with respect to an axis of rotation. The controller, which has an integral control loop with a first integrator block, is in communication with the position sensor and configured to directly receive the raw sine and cosine signals from the position sensor. The controller is also configured to generate corrected sine and cosine signals by applying a first predetermined trigonometric relationship. Application of the first predetermined trigonometric relationship provides an amplitude error input signal to the first integrator block. The controller executes a control action of the rotary device via a set of output signals using the corrected raw sine and cosine signals. The first predetermined trigonometric relationship may be represented as:

$$S_C^2 - C_C^2$$

with $S_C$ and $C_C$ representing the corrected sine and cosine signals, respectively.

The integral control loops may include a second integrator block, in which case the controller applies a second predetermined trigonometric relationship in order to provide an orthogonality error input signal to the second integrator block. The second predetermined trigonometric relationship may be represented as:

$$S_C \cdot C_C$$

The integral control loops may be configured to correct for relative orthogonality errors in the corrected sine and cosine signals using the first and second integrators, with the corrected cosine signal in this instance being $C_C = M_{a,c} A_2 \cos(\theta - \phi) - M_O A'_1 \sin(\theta)$ and the corrected sine signal represented as $S_C = S_R$. Here, $\theta$ is the angular position of the rotary device, $M_O$ is a multiplier output from the second integrator block, $M_{a,c}$ is a multiplier output from the first integrator block, $\phi$ is the orthogonality error between the raw sine and cosine signals, $A_2$ is the amplitude of the raw (i.e., uncompensated) cosine signal, $A'_1$ is the amplitude of the corrected sine signal, and $S_R$ represents the raw sine signal.

The integral control loops may include an amplitude detection block configured to detect a respective amplitude of the raw sine signal and the raw cosine signal. The amplitude detection block may be programmed to determine which of the respective amplitudes of the raw sine signal and the raw cosine signal is closest to a desired reference amplitude. Or, the amplitude detection block may be programmed to determine which of the respective amplitudes of the raw sine signal and the raw cosine signal is larger. This information can be used to determine whether to compensate the raw sine signal $S_R$ or the raw cosine signal $C_R$.

The integral control loops in some embodiments may include an amplitude tracking outer control loop having a summation node and a third integrator block. The summation node receives an amplitude tracking control signal ($CC_{AT}^2$) as an input, and applies a third predetermined trigonometric relationship in order to provide an error input signal to the third integrator block. The third predetermined trigonometric relationship is:

$$CC_{AT}^2 - (S_C^2 + C_C^2).$$

The rotary device may be a rotor of an electric machine such as an electric traction motor. In some embodiments the vector-based position sensor may be a resolver. The system itself may be embodied as a vehicle having drive wheels, with the traction motor being operable for generating torque to power the drive wheels.

A method is also disclosed for providing error correction in a vector-based position sensing system having a rotary device and a vector-based position sensor positioned in proximity to the rotary device. In an embodiment, the method includes receiving, via a controller having one or more integral control loops, raw sine and cosine signals from the vector-based position sensor. The raw sine and cosine signals are indicative of an angular position of the rotary device with respect to an axis of rotation. The method also includes generating corrected sine and cosine signals from the received raw sine and cosine signals by applying the output of a first predetermined trigonometric relationship as amplitude error input signal to a first integrator block of the controller. Additionally, the method includes executing a control action with respect to the rotary device via a set of output signals using the corrected raw sine and cosine signals. As noted above, the first predetermined trigonometric relationship is $S_C^2 - C_C^2$.

The method may include applying the output of a second predetermined trigonometric relationship noted above as an orthogonality error input signal to a second integrator block of the controller, and/or performing other optional processes such as correcting for relative orthogonality errors in the corrected sine and cosine signals using the first and second integrator blocks, using an amplitude detection block to detect a respective amplitude of the raw sine signal and the raw cosine signal to determine which of these signals to compensate, or using the amplitude tracking outer control loop as set forth above.

The above-noted and other features and advantages of the present disclosure are readily apparent from the following detailed description of the best modes for carrying out the disclosure when taken in connection with the accompanying drawings.

DETAILED DESCRIPTION

Figure 1:
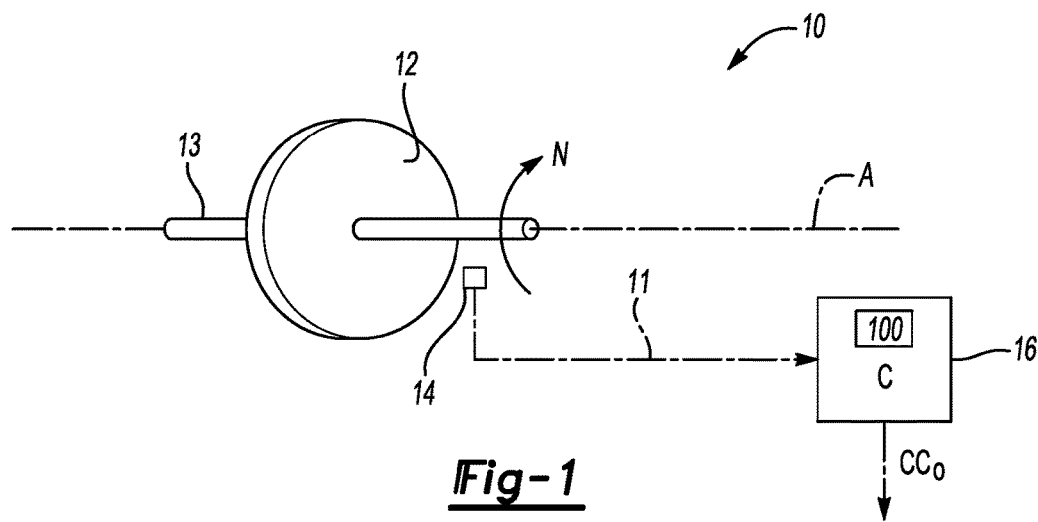
FIG. 1 is a schematic illustration of a system having an example rotary device, a vector-based position sensor, and a controller programmed with an integral control loop that is configured to eliminate amplitude and orthogonality errors in raw sine/cosine signals from the vector-based position sensor.

Referring to the drawings, wherein like reference numbers refer to the same or similar components throughout the several views, and beginning with FIG. 1, an example system 10 is shown that includes a rotary device 12, a vector-based position sensor 14, and a controller (C) 16 in communication with the vector-based position sensor 14. The controller 16 is configured, i.e., programmed in software and equipped in hardware, to eliminate signal errors in raw sine and cosine signals (arrow 11) as measured by the sensor 14, and to ultimately execute a control action with respect to the rotary device 12 and/or other components of the system 10 via a set of output signals (arrow $CC_O$). In particular, the controller 16 applies predetermined trigonometric relationships within an integral control loop 100 to correct the raw sine/cosine signals (arrow 11) for amplitude and/or orthogonality errors. As noted below, amplitude error correction may be accomplished alone or in conjunction with orthogonality error correction in different example embodiments.

The vector-based position sensor 14 of FIG. 1 may be variously embodied as a resolver, an encoder, a magneto-resistive sensor, or other sensor operable for generating the raw sine and cosine signals (arrow 11) having amplitude and phase information. The rotary device 12 may be a driven rotary component or a driving rotary component of a vehicular or non-vehicular powertrain, e.g., a rotor of an electric machine, an engine shaft or a flywheel, or other type of wheel, shaft, gear element, or other rotary device having a rotational speed (N), an axis of rotation (A), and a determinable angular position with respect to the axis of rotation (A). The rotary device 12 may be coupled to an axle 13 such that torque from rotation of the rotary device 12 may be delivered to a load.

Figure 2:
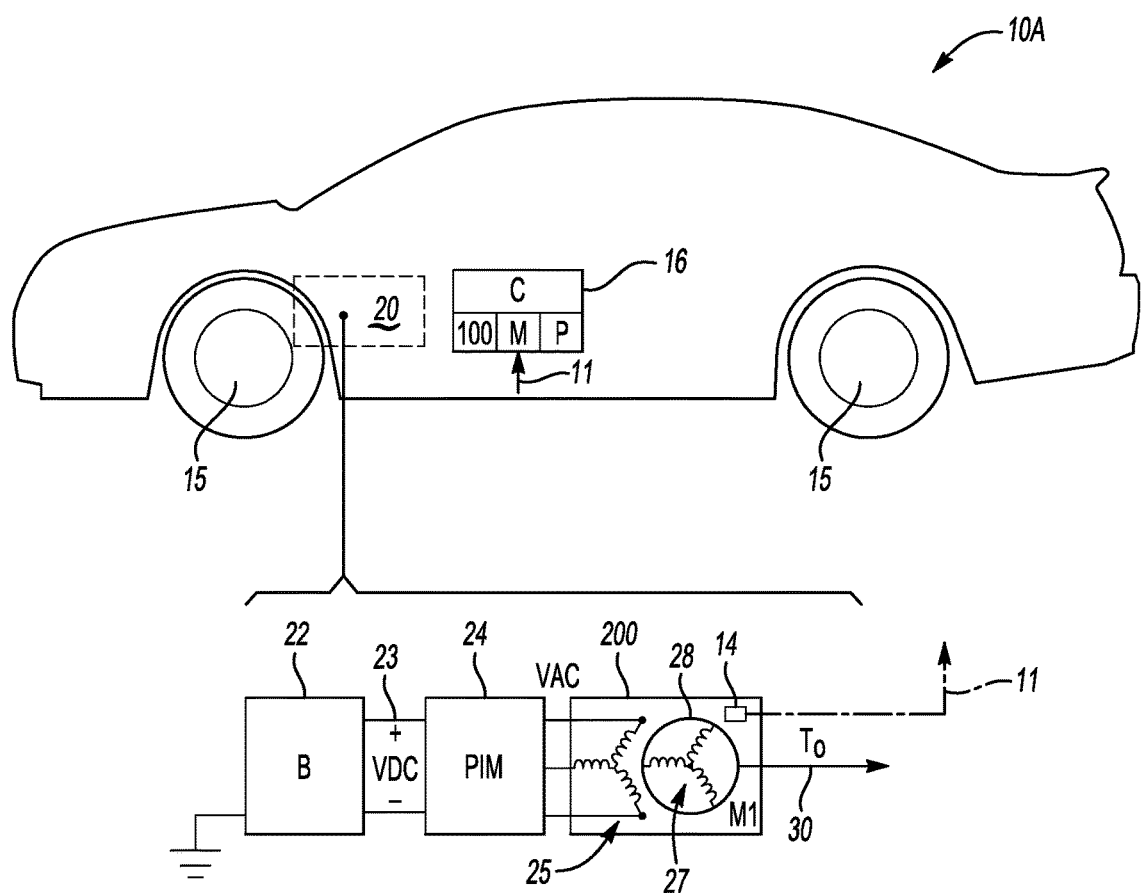
FIG. 2 is a schematic illustration of a rotary device in the form of an electric machine used as part of system in the form of an example vehicle.

As depicted in FIG. 2, for example, the rotary device 12 of FIG. 1 may be optionally embodied as an electric machine 200 (M1) within an electrical system 20, e.g., of an automotive vehicle 10A, a robot, or other mobile platform, or alternatively of a power plant or an appliance. The electric machine 200 is operable for generating output torque (arrow To) and delivering the same to a load in the form, for instance of front and/or rear drive wheels 15 in the non-limiting vehicle 10A, either directly or via a transmission (not shown), or alternatively to generate electricity for storage in a battery pack (B) 22.

By way of an example, the electric machine 200 may be embodied as a polyphase electric traction motor having stator windings 25 and rotor windings 27. When the windings 25 and 27 are electrically energized, a rotor 28 connected to a motor output shaft 30 delivers the output torque (arrow To) to the drive wheels 15 or another load such as a belt and pulley system (not shown). In this illustrative example embodiment, a power inverter module (PIM) 24 is electrically connected to the battery pack 22 over a high-voltage bus 23 and operable for inverting a direct current voltage (VDC) and corresponding electrical current from the battery pack 22 into an alternating current voltage (VAC) and electrical current, e.g., using a series of semiconductor switches, diodes, and other semiconductor components (not shown) and pulse width modulation or other suitable switching techniques. In other embodiments, the rotary device 12 of FIG. 1 may be configured as an engine shaft, a flywheel, or other component (not shown) having a measurable rotary position.

In order to control operation of the rotary device 12, the controller 16 is programmed and equipped with an integral control loop 100 having, as set forth below with reference to FIGS. 3-6, a plurality of integrator blocks 50 and 55, and optionally 150. The term "integrator" as used herein refers to portions of the integral control loop 100 that provide the integral or error-accumulation function of the controller 16. In this manner, the integrator blocks 50 and 55 are provided with error signals as set forth herein with particular reference to FIG. 3. The error signals thus enable the integrator blocks 50 and 55, and additionally the integrator block 150 in some embodiments, to eliminate amplitude and orthogonality errors in the collected raw sine and cosine signals 11.

The controller 16 may be embodied as one or more computer devices with memory (M) and a processor (P). The memory (M) may include tangible, non-transitory memory, e.g., read only memory, whether optical, magnetic, flash, or otherwise. The controller 16 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

More specifically, the controller 16 is programmed to apply predetermined trigonometric relationships in response to receipt of the raw sine and cosine signals (arrow 11). The disclosed approach does not use or require intervening calculation of position or speed information by an integrated circuit or within the controller 16, and in this manner is "input signal-driven" by allowing the controller 16 to act directly on the raw sine and cosine signals (arrow 11) as output or otherwise provided by the sensor 14.

Figure 3:
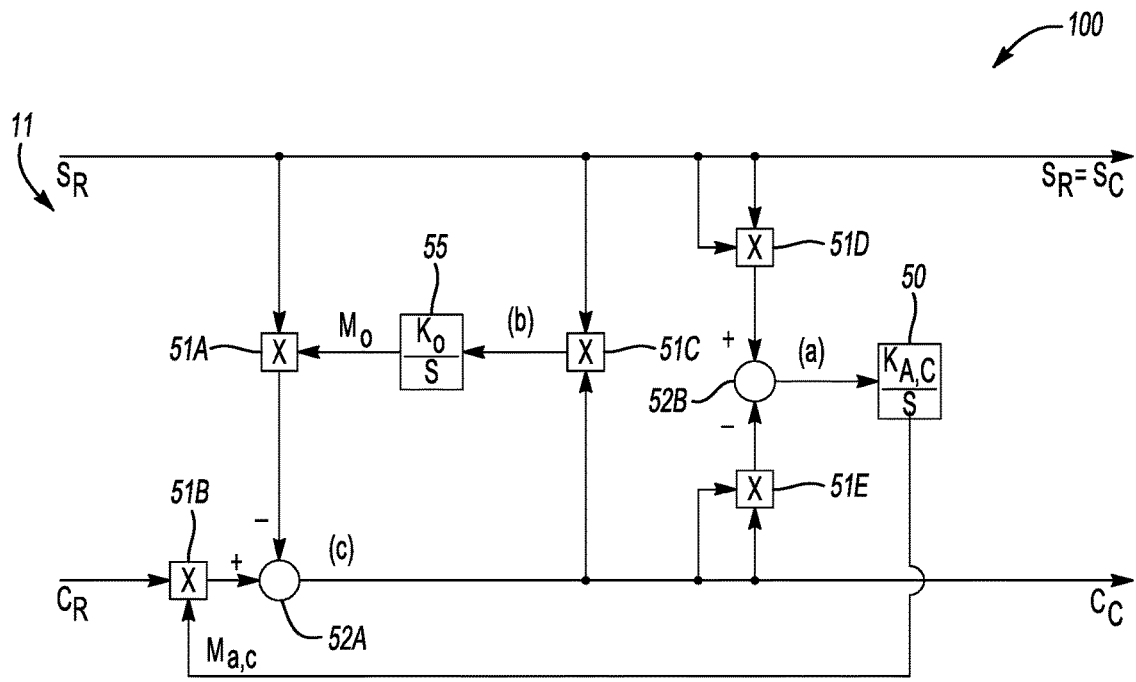
FIG. 3 is a schematic control loop diagram describing operation of the controller of FIG. 1 with respect to correction of amplitude and orthogonality errors in raw sine and cosine signals from a vector-based position sensor.

FIG. 3 depicts an example configuration of the integral control loop 100 that is suitable for implementing the present disclosure via operation of the controller 16. The raw sine and cosine signals (arrow 11) are depicted as separate raw sine and cosine signals $S_R$ and $C_R$, respectively. The raw sine and cosine signals $S_R$ and $C_R$ should ideally have the same amplitude and should be orthogonal, i.e., phase-shifted by exactly 90 degrees relative to each other. However, errors in amplitude and/or orthogonality may still result due to imperfections in the sensory and transmission hardware of the controller 16 and the sensor 14. Left uncorrected, such errors may result in position measurement errors, which depending on severity may ultimately affect control functionality or accuracy of the system 10.

The raw sine and cosine signals (arrow 11) that are output by the sensor 14 or extracted from the outputs of the sensor 14 via signal processing, e.g., via output demodulation when the sensor 14 is embodied as a resolver, may be individually expressed as:

$$S_R = A_1 \sin(\theta)$$

$$C_R = A_2 \cos(\theta - \phi)$$

Corrected sine and cosine signals as output by the controller 16 may be expressed as:

$$S_C = A_1' \sin(\theta)$$

$$C_C = A_2' \cos(\theta - \phi')$$

where $\phi$ and $\phi'$ are the raw and corrected orthogonality errors and $\theta$ is the angular position to be determined. As noted above, ideally the raw sine and cosine signals $S_R$ and $C_R$ are exactly 90 degrees out of phase such that $\phi=0$. Similarly, the amplitude $(A_1)$ of the raw sine signal $S_R$ and the amplitude $(A_2)$ of the raw cosine signal $C_R$ should be identical. The control loop 100 of FIG. 1 is therefore configured to ensure correction of amplitude and orthogonality errors prior to control of the rotary device 12 or other components in the system 10. The corrected amplitudes $(A_1')$ and $(A_2')$ therefore are identical by operation of the integral control loop 100, and the corrected orthogonality $\phi'$ should ultimately be equal to zero.

Specifically, the controller 16 of FIGS. 1 and 2 provides an amplitude error signal as follows:

$$S_C^2 - C_C^2 = \frac{A_1'^2 - A_2'^2}{2} - \frac{A_1'^2}{2}\cos(2\theta) - \frac{A_2'^2}{2}\cos[2(\theta - \phi')]$$

Because the measured angular position $\theta$ ranges from 0 to $2\pi$ and is an oscillating signal, over a full electrical cycle of the sensor 14 the above-noted expression $$-\frac{A_1'^2}{2}\cos(2\theta) - \frac{A_2'^2}{2}\cos[2(\theta - \phi)]$$

averages to zero. Therefore, an average amplitude correction error term over a full cycle of the sensor 14 is simplified as:

$$S_C^2 - C_C^2 \approx \frac{A_1'^2 - A_2'^2}{2} \quad \text{Expression (a)}$$

This particular error term of expression (a) is used by a first integrator block 50 in the integral control loop 100 to drive amplitude errors to zero. That is, the controller 16 manipulates either of the amplitudes $A_1$ or $A_2$ and leaves the other amplitude $A_1$ or $A_2$ unchanged in order to correct for amplitude errors in the raw sine and cosine signals, respectively.

Similarly, an orthogonality error term may be generated by the controller 16 using the following expression:

$$S_C \cdot C_C = \frac{A_1' \cdot A_2'}{2}[\sin[2\theta - \phi'] + \sin(\phi')]$$

As with the amplitude error expression noted above, the expression $\sin[2\theta-\phi']$ represents an oscillating signal that averages to zero over a full cycle of the sensor 14. Therefore, assuming that $\phi'$ is small:

$$S_C \cdot C_C \approx \left(\frac{A_1' - A_2'}{2}\right)\phi' \quad \text{Expression (b)}$$

Expression (b) is thus used as an error input term to a second integrator block 55 to drive orthogonality errors to zero as part of the integral control loop 100. As will be explained below in more detail, the controller 16 may be allowed to run amplitude correction without also correcting for orthogonality error. However, in order to correct for orthogonality error without inducing additional amplitude error, the controller 16 also corrects for amplitude error given the interdependency of the above-stated Expressions (a) and (b), as best shown in expression (c) as set forth below.

In the example integral control loop 100 of FIG. 3, the raw sine signal $(S_R)$ is passed through as a reference signal and the raw cosine signal $(C_R)$ is corrected. This embodiment assumes that a prior determination is made that a greater amount of signal error exists in the raw cosine signal $(C_R)$. One possible way to make such a determination beforehand is described below with reference to FIG. 5. Therefore, the description of FIG. 3 in which the raw sine signal $(S_R)$ is the reference signal (i.e., is left uncorrected) and the raw cosine signal $(C_R)$ is the signal to be compensated (corrected) may be readily achieved in the reverse simply by swapping the position of the raw sine and cosine signals $(S_R$ and $C_R)$ of FIG. 3 and changing the sign of certain operations. For illustrative simplicity, however, the raw sine signal $(S_R)$ will be described herein as the reference signal without limiting the present disclosure to such an embodiment.

The integral control loop 100 of FIG. 3 includes a plurality of multiplier nodes 51A, 51B, 51C, 51D, and 51E, a plurality of summation nodes 52A and 52B, and the first and second integrators 50 and 55 noted above. The first integrator block 50 receives the above-described amplitude error input term set forth above as Expression (a), i.e., $$S_C^2 - C_C^2 \approx \frac{A_1'^2 - A_2'^2}{2}.$$

The notation $$\frac{K_{A,C}}{s}$$

is used in FIG. 3 to denote that the second integrator block 50 handles the steady-state amplitude error by manipulating the amplitude of the raw cosine signal. The output of the first integrator block 50, i.e., arrow $M_{a,c}$, describes the multiplier that is required to ensure that the corrected cosine signal $C_C$ has the same amplitude as the corrected sine signal $S_C$, with the subscript "c" of arrow $M_{a,c}$ representing "cosine". This multiplier as output from the first integrator block 50 is then fed into multiplier block 51B along with the raw cosine signal ($C_R$). The product of the raw cosine signal $C_R$ and multiplier ($M_{a,c}$) is then fed into the summation node 52A.

As an error input, the second integrator block 55 receives the orthogonality error input term set forth above as Expression (b), i.e., $$\left(\frac{A_1' - A_2'}{2}\right)\phi'.$$

The notation $$\frac{K_o}{s}$$

is used in FIG. 3 to denote that the second integrator block 55 handles the steady-state error in orthogonality. The output of the second integrator block (arrow $M_O$) describes the component of the sine signal which should be added or subtracted from the cosine signal to ensure that the cosine signal is 90 degrees out of phase from the reference sine signal. This output (arrow $M_o$) is fed into the multiplier node 51A along with the raw sine signal $S_R$. The corrected cosine $C_C$ then be expressed as:

$$C_C = M_{a,c}A_2 \cos(\theta-\phi) - M_O A_1' \sin(\theta) \quad \text{Expression (c)}$$

Expression (c) is the output of the summation node 52A. The integral control loop 100 uses the derived error terms as specified in Expressions (a) and (b) above to drive steady-state amplitude and orthogonality errors to zero and ultimately output corrected sine and cosine signals $S_C$ and $C_C$, respectively. When the steady-state amplitude and orthogonality errors have been driven to zero, the corrected cosine signal, $C_C$, has the same amplitude as the corrected sine signal, $S_C$, and no phase term, $\phi'$. Under this condition the corrected cosine signal may be expressed as:

$$C_C = A_1' \cos(\theta)$$

Therefore, by equating the two expressions for $C_C$ above, it can be seen that steady-state amplitude and orthogonality errors will be driven to zero when:

$$(M_{a,c}A_2)^2 = A_1'^2 + (M_O A_1')^2 \text{ and } \tan(\phi) = M_O.$$

Various approaches may be used by the controller 16 of FIGS. 1 and 2 to thereafter derive the angular position ($\theta$) of the rotary device 12. For example, the controller 16 may solve the arctangent function (atan2) to derive the angular position ($\theta$). Once position is determined, the controller 16 may execute a control action with respect to the system 10 or the vehicle 10A, such as by controlling voltage or current supplied to, and thus speed and/or torque of, the rotary device 12, e.g., the electric machine 200. The control loop 100 may be modified for enhanced performance as set forth below.

Figure 4:
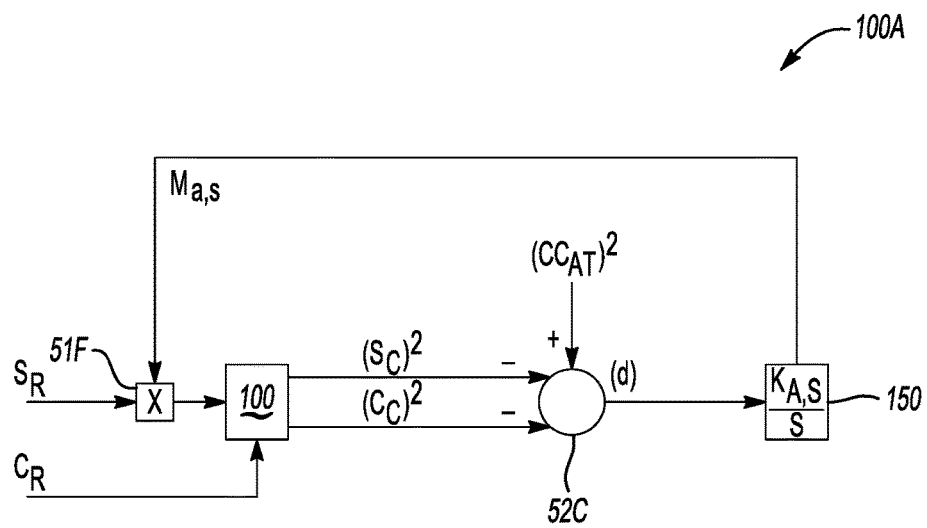
FIG. 4-6 are schematic control loop diagrams describing optional enhancements to the approach depicted in FIG. 3.

Referring to FIG. 4, optional enhancements to the approach of FIG. 2 include using an amplitude tracking outer control loop 100A in conjunction with the above-described integral control loop 100. Inputs to an additional summation node 52C of the outer control loop 100A are the respective compensated/corrected sine and cosine signals $S_C$ and $C_C$ from FIG. 3. These inputs are squared and subtracted from the square of a calibrated amplitude tracking control signal, represented in FIG. 4 as $(CC_{AT})^2$. The value of this signal is determined beforehand as a reference signal instructing the integral control loop 100 as to the desired magnitudes of the respective amplitudes $A_1$ and $A_2$ of the raw sine and cosine signals $S_R$ and $C_R$. For instance, using the trigonometric identity $\sin^2(\theta) + \cos^2(\theta) = 1$, the value of the amplitude tracking control signal ($CC_{AT}$) could be set to 1 as a reference, such that Expression (d) as set forth below and used in FIG. 4 equals zero when the reference and compensated signal amplitudes are both 1.

In particular, in the amplitude tracking outer control loop 100A of FIG. 4 the summation node 52C subtracts the square of the corrected sine and cosine signals, i.e., $S_C^2$ and $C_C^2$, respectively, from the square of the amplitude tracking control signal $CC_{AT}^2$ to produce an input error signal that is fed into a third integrator block 150, which in turn is abbreviated $$\frac{K_{A,S}}{S}.$$

The corrected sine and cosine signals from the integral control loop 100A of FIG. 4 may be represented as:

$$S_C = A_1' \sin(\theta) = (M_{as})A_1 \sin(\theta)$$

$$C_C = A_2' \cos(\theta-\phi') = (M_{a,c})A_2 \cos(\theta-\phi) - (M_o)(M_{a,s})A_1 \sin(\theta)$$

The output of the summation node 52C of FIG. 4 may therefore be expressed as:

$$CC_{AT}^2 - (S_C^2 + C_C^2) =$$
$$CC_{AT}^2 - \left(\frac{A_1'^2 + A_2'^2}{2} - \frac{A_1'^2}{2}\cos(2\theta) + \frac{A_2'^2}{2}\cos[2(\theta-\phi')]\right)$$

Over a full electrical cycle of sensor 14, the average of the aboce expression reduces to:

$$CC_{AT}^2 - (S_C^2 + C_C^2) \approx CC_{AT}^2 - \frac{A_1'^2 + A_2'^2}{2} \quad \text{Expression (d)}$$

Thus, Expression (d) forms an error input term for the third integrator block 150. The output ($M_{a,s}$) of the third integrator block 150 is then fed into another multiplication node 51F, with subscripts a and s representing that the output ($M_{a,s}$) represents the amplitude correction applied to the sine signal.

At multiplication node 51F, the output ($M_{a,s}$) is multiplied by the raw sine signal $S_R$ and thereafter used as an input of the earlier-described integral control loop 100 of FIG. 3. In this particular embodiment, therefore, the approach of the controller 16 entails manipulating the amplitude ($A_1$) of the sine signal and allowing the amplitude $A_2$ of the cosine signal to follow. This process continues until the square of the amplitude tracking control signal, i.e., $(CC_{AT})^2$, equals the sum of the square of the individual corrected sine and cosine signals $S_C$ and $C_C$, respectively, i.e., until $S_C^2 + C_C^2 = CC_{AT}^2$. The controller 16 calculates the angular position (θ) using the corrected sine and cosine signals $S_C$ and $C_C$, e.g., using the atan2 function as set forth above or using another suitable technique.

Figure 5:
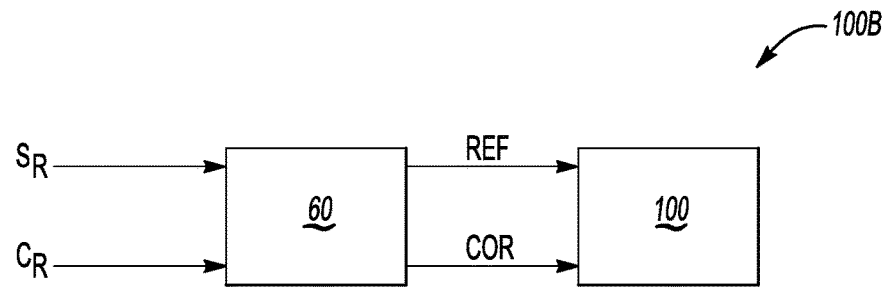

FIG. 5 depicts an enhanced control loop 100B in which an optional amplitude detection block 60 is used to decide which of the raw sine or cosine signals $S_R$ and $C_R$ to use as the reference (REF). For instance, in FIG. 3 the sine signal is used as the reference and the raw cosine $C_R$ is corrected (COR). Amplitude detection block 60 may, for instance, include a comparator circuit or other hardware configured to process the respective raw sine and cosine signals $S_R$ and $C_R$ to determine which of the two signals has more desirable amplitude properties relative to the other. In an example embodiment, the amplitude detection block 60 may simply determine which of the amplitudes $A_1$ or $A_2$ is greater, and thus more likely to have a more optimal signal-to-noise ratio. Or, the amplitude detection block 60 may be programmed with a desired amplitude and the particular amplitude $A_1$ or $A_2$ closest to this desired amplitude may be used as the reference. The controller 16 then proceeds to execute the integral control loop 100 as set forth above.

The present approach may be used to correct for amplitude errors in the raw sine and cosine signals (arrow 11 of FIG. 1) without also having to correct for orthogonality errors, i.e., $K_o$ may be set to zero. Amplitude correction may be run by the controller 16 when running command tracking as described with reference to outer control loop 100A of FIG. 4. While orthogonality correction is not required when doing this, correcting for orthogonality errors may help to improve overall performance of the control loop 100.

Figure 6:
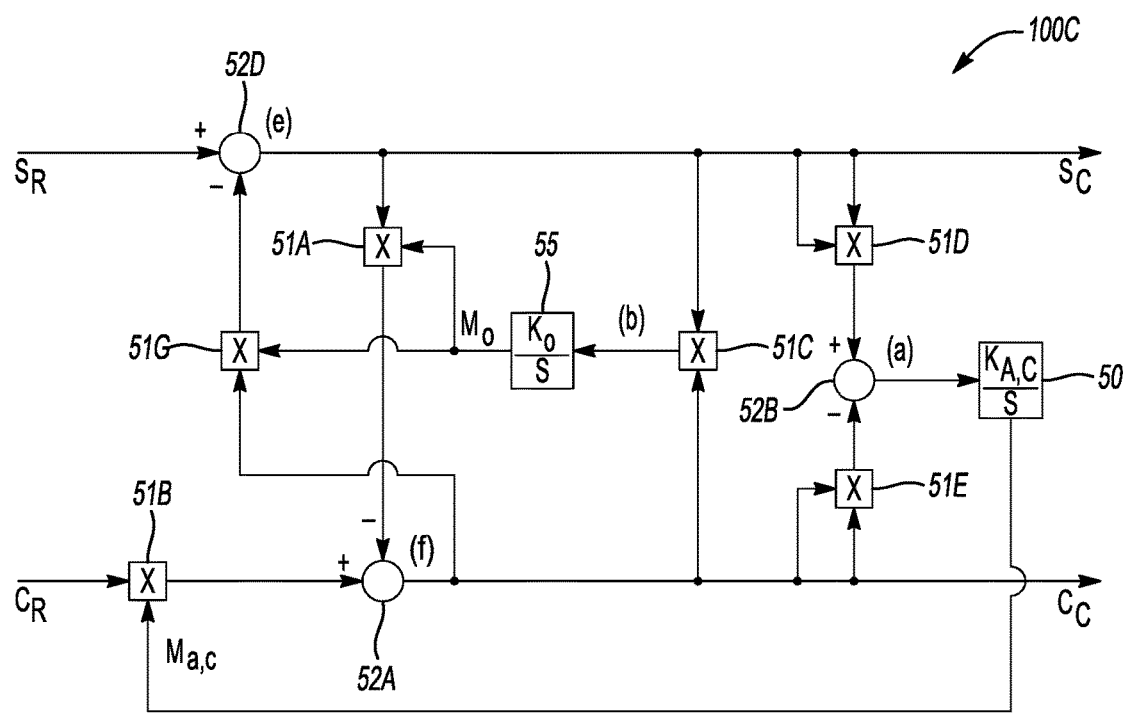

Referring to FIG. 6, an additional enhanced control loop 100C is depicted that is intended to reduce the potential maximum absolute position reference error that may be induced through orthogonality correction. The control loop 100C distributes changes in phase (φ) nearly equally among both sine and cosine signals $S_R$, $C_R$ rather than modifying the phase of just the corrected signal. The approach of FIG. 6 thus provides for dual-signal orthogonality correction, and as such is a possible modification to the approach depicted in FIG. 3.

The control loop 100C differs from the control loop 100 of FIG. 3 in the addition of a summation node 52D and a multiplier node 51G. Rather than allowing the raw sine signal $S_R$ to pass through as in FIG. 3, the output (arrow $M_o$) of the second integrator block 55 is instead fed into the multiplier nodes 51A and 51G, and multiplied at node 51G by the output of the summation node 52A. The output of summation node 52D may be represented as:

$$S_C = \frac{S_R - M_O \cdot M_{ac} \cdot C_R}{1 - M_O^2} \quad \text{Expression (e)}$$

Expression (c) from summation node 52A of FIG. 3 describes the corrected cosine signal ($C_C$), as is thus modified as follows:

$$C_C = \frac{M_{a,c} \cdot C_R - M_O \cdot S_R}{1 - M_O^2} \quad \text{Expression (f)}$$

In this manner, correction in relative error in orthogonality may be applied to both the raw sine and raw cosine signals $S_R$ and $C_R$.

Those of ordinary skill in the art will appreciate that other embodiments may be realized within the scope of the disclosure. For example, the integral control loop 100 and its various enhancements may be used as part of a method for error correction in a vector-based position sensing system having the rotary device 12 and vector-based position sensor 14 of FIG. 1. Such a method may entail, for instance receiving, via the controller 16 of FIG. 1 having the integral control loop 100 of FIG. 3, raw sine and cosine signals ($S_R$, $C_R$) from the vector-based position sensor 14 that are indicative of an angular position (θ) of the rotary device 12 with respect to its axis of rotation (A). The method may also include generating corrected sine and cosine signals ($S_C$, $C_C$) from the received raw sine and cosine signals ($S_R$, $C_R$) by applying a first predetermined trigonometric relationship as an amplitude error input signal to the first integrator block 50 of the controller 16. Thereafter, the method may include executing a control action with respect to the rotary device 12 via the set of output signals (arrow $CC_o$) using the corrected raw sine and cosine signals ($S_C$, $C_C$). As noted above, the first predetermined trigonometric relationship is Expression (a) as explained above.

The same method may also include applying a second predetermined trigonometric relationship, i.e., Expression (b), as an orthogonality error input signal to the second integrator block 55 of the controller 16.

The method may include correcting for relative orthogonality errors in the corrected sine and cosine signals ($S_C$, $C_C$) using the first and second integrator blocks 50 and 55, i.e., using Expression (c) detailed above. In various other embodiments, the method may include using the amplitude detection block 60 of FIG. 5 to detect respective amplitudes of the raw sine signal ($S_R$) and the raw cosine signal ($C_R$). The amplitude detection block 60 may, as part of the method, determine which of these respective amplitudes is closest to a desired reference amplitude, or determine which of the respective amplitudes is larger than the other. Similarly, the method may include receiving the amplitude tracking control signal ($CC_{AT}^2$) as an input, as shown in FIG. 4, and applying a third predetermined trigonometric relationship, i.e., Expression (d), to generate an error input signal to the third integrator block 150.

While the best modes for carrying out the disclosure have been described in detail, those familiar with the art to which this disclosure relates will recognize various alternative designs and embodiments for practicing the disclosure within the scope of the appended claims.

What is claimed is:

1. A system comprising:
   a rotary device having an axis of rotation;
   a vector-based position sensor configured to output raw sine and cosine signals indicative of an angular position of the rotary device with respect to the axis of rotation; and
   a controller having an integral control loop with a first integrator block and a second integrator block, wherein the controller is in communication with the vector-based position sensor and is configured to: directly receive the raw sine and cosine signals from the vector-based position sensor, apply an amplitude error input signal to the first integrator block using a first predetermined trigonometric relationship, apply an orthogonality error input signal to the second integrator block using a second predetermined trigonometric relationship, generate corrected sine and cosine signals using the amplitude error input signal and the orthogonality error input signal, and execute a control action with respect to operation of the rotary device via a set of output signals using the corrected raw sine and cosine signals, the control action including controlling a speed and/or a torque of the rotary device;

wherein the first predetermined trigonometric relationship is $S_C{}^2-C_C{}^2$ and the second predetermined trigonometric relationship is $S_C \cdot C_C$, with Sc and $C_C$ representing the corrected sine and cosine signals, respectively.

2. The system of claim 1, wherein the integral control loop is configured to correct for relative orthogonality errors in the corrected sine and cosine signals using the first and second integrator blocks, and wherein the corrected cosine signal is:

$$C_C = M_{a,c} A_2 \cos(\theta-\phi) - M_O A_1' \sin(\theta)$$

and the corrected sine signal is:

$$S_C = S_R$$

where θ is the angular position, $M_o$ is a multiplier output from the second integrator block, $M_{a,c}$ is a multiplier output from the first integrator block, φ is the orthogonality error between the raw sine ($S_R$) and cosine ($C_R$) signals, $A_2$ is the amplitude of the raw cosine signal, and $A_{1'}$ is the corrected amplitude of the raw sine signal.

3. The system of claim 1, wherein the integral control loop includes an amplitude detection block configured to detect a respective amplitude of the raw sine signal and the raw cosine signal.

4. The system of claim 3, wherein the amplitude detection block is programmed to determine which of the respective amplitudes of the raw sine signal and the raw cosine signal is closest to a desired reference amplitude.

5. The system of claim 3, wherein the amplitude detection block is programmed to determine which of the respective amplitudes of the raw sine signal and the raw cosine signal is larger.

6. The system of claim 1, wherein the integral control loop includes an amplitude tracking outer control loop having a summation node and a third integrator block, wherein the summation node receives an amplitude tracking control signal ($CC_{AT}{}^2$) as an input, and calculates a third predetermined trigonometric relationship in order to provide an error input signal to the third integrator block, wherein the third predetermined trigonometric relationship is:

$$CC_{AT}{}^2-(S_C{}^2+C_C{}^2).$$

7. The system of claim 1, wherein the rotary device is a rotor of an electric machine.

8. The system of claim 7, wherein the electric machine is a traction motor and the vector-based position sensor is a resolver.

9. The system of claim 8, wherein the system is a vehicle having drive wheels and the traction motor is operable for generating torque to power the drive wheels.

10. A method for error correction in a vector-based position sensing system having a rotary device and a vector-based position sensor positioned in proximity to the rotary device, the method comprising:

receiving, via a controller having an integral control loop, raw sine and cosine signals from the vector-based position sensor that are indicative of an angular position of the rotary device with respect to an axis of rotation;

generating corrected sine and cosine signals from the received raw sine and cosine signals by using a first predetermined trigonometric relationship to apply an amplitude error input signal to a first integrator block of the controller and by using a second predetermined trigonometric relationship to apply an orthogonality error input signal to a second integrator block of the controller using a second predetermined trigonometric relationship; and executing a control action with respect to the rotary device via a set of output signals using the corrected raw sine and cosine signals;

wherein the first predetermined trigonometric relationship is $S_C{}^2-C_C{}^2$ and the second predetermined trigonometric relationship is $S_C \cdot C_C$, with $S_C$ and $C_C$ representing the corrected sine and cosine signals, respectively.

11. The method of claim 10, further comprising correcting for relative orthogonality errors in the corrected sine and cosine signals using the first and second integrator blocks, wherein the corrected cosine signal is:

$$C_C = \frac{M_{a,c} \cdot C_R - M_O \cdot S_R}{1 - M_O^2}$$

and the corrected sine signal is:

$$S_C = \frac{S_R - M_O \cdot M_{ac} \cdot C_R}{1 - M_O^2}$$

where $M_o$ is a multiplier output from the second integrator block, $M_{a,c}$ is a multiplier output from the first integrator block, $S_R$ is the raw sine signal, and $C_R$ is the raw cosine signal.

12. The method of claim 10, further comprising using an amplitude detection block to detect a respective amplitude of the raw sine signal and the raw cosine signal.

13. The method of claim 12, further comprising determining, via the amplitude detection block, which of the respective amplitudes of the raw sine signal and the raw cosine signal is closest to a desired reference amplitude.

14. The method of claim 12, further comprising determining which of the respective amplitudes of the raw sine signal and the raw cosine signal is larger than the other.

15. The method of claim 10, wherein the integral control loop includes an amplitude tracking outer control loop having a summation node and a third integrator block, further comprising: receiving, via the summation node, an amplitude tracking control signal ($CC_{AT}{}^2$) as an input, and outputting a third predetermined trigonometric relationship as an error input signal to the third integrator block, wherein the third predetermined trigonometric relationship is:

$$CC_{AT}{}^2-(S_C{}^2+C_C{}^2).$$

16. The method of claim 10, wherein the rotary device is a rotor of an electric machine, and wherein executing a control action with respect to the rotary device includes controlling an operation of the electric machine.

* * * * *